UNITED STATES PATENT OFFICE.

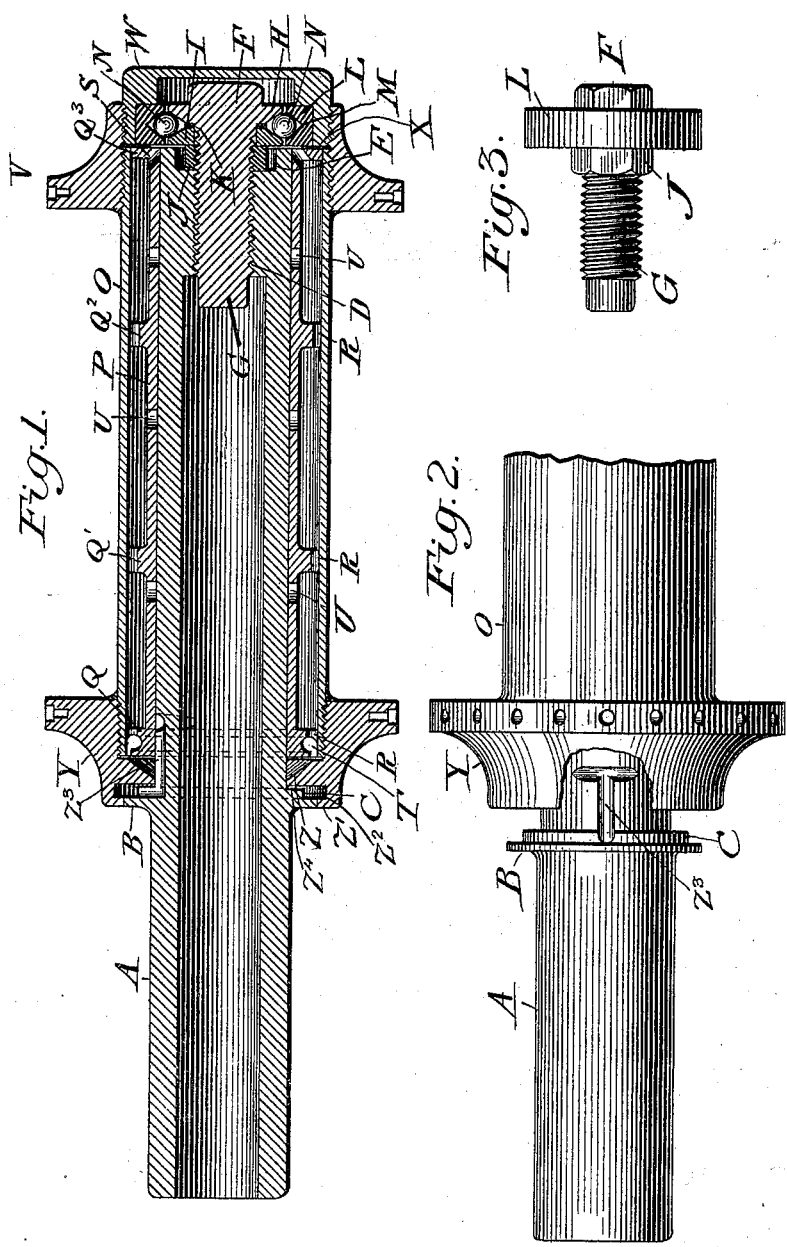

HARLAN P. WELLS AND OSGOOD MORRILL, OF AMESBURY, MASSACHUSETTS.

AXLE AND AXLE-BOX.

SPECIFICATION forming part of Letters Patent No. 635,066, dated October 17, 1899.

Application filed February 27, 1899. Serial No. 707,094. (No model.)

*To all whom it may concern:*

Be it known that we, HARLAN P. WELLS and OSGOOD MORRILL, citizens of the United States, residing at Amesbury, in the county of Essex and State of Massachusetts, have invented certain new and useful Improvements in Axles and Axle-Boxes, of which the following is a specification.

The object of our invention is the production of an axle and axle-box which shall be provided with antifriction means for taking the entire end thrust in both directions longitudinally, for securing the axle in the box, and for holding the shoulder or flange of the axle out of frictional engagement with the box, which shall be practically dust-proof, which shall be so constructed and combined that the axle will take the entire load and a series of balls the end thrusts in both directions, which shall be provided with a thrust ball-bearing adapted to be adjusted to compensate for any wear, and which, withal, shall possess many other desirable features and characteristics adapting them to effectively fulfill all the requirements of service.

With the above end in view the invention consists in certain novelties of construction and combinations and arrangements of parts hereinafter set forth, and particularly enumerated in the claims.

The accompanying drawings illustrate one example only of the physical embodiment of the invention and which is constructed according to the best of the several modes we have so far devised for applying the principle.

Figure 1 is a view of the axle and box in section, the same being taken in a perpendicular and longitudinal plane. Fig. 2 is a fragmentary top plan view showing the exterior of the box and the axle withdrawn therefrom a short distance. Fig. 3 is a view of the ball-bearing cage as it appears when detached from the axle.

Referring to the figures of the drawings, the letter A designates the axle proper; B, a circular flange of larger diameter than the bearing portion of the axle; C, a shoulder or offset, also circular in shape and of somewhat less diameter than that of the flange B, but larger than that of the axle; D, a threaded longitudinal opening in the end of the axle; E, a circular shallow recess in the extreme end of the axle and of larger diameter than the threaded opening; F, a ball-bearing cage; G, an angularly headed and threaded bolt adapted to engage the threaded opening in the end of the axle; H, a flange with a beveled edge located adjacent the angular head of the bolt and in this instance integral therewith; I, a removable washer having a beveled edge and surrounding the bolt; J, a jam-nut.

K K are small washers located between the flange H and beveled washer I and adapted to be removed.

L is a ring; M, a groove extending around and within the inner surface of the ring.

N are balls located in the groove M and between the beveled surfaces of the washer I and the integral flange.

O is the outer shell or wall of the axle-box, shaped like a hollow cylinder and externally threaded at the ends; P, the inner shell or wall of the box, also cylindrical in shape and of such a size or diameter on the inside that it will frictionally engage the outer surface of the axle.

Q Q' Q² Q³ are circular flanges or projections integral with the inner shell or wall of the box and so engaging the inner surface of the outer shell O that both shells are permanently united and will move together; R R, notches or grooves made in the circular flanges; S S, a series of holes through the inner shell or wall and adjacent the flange Q³ at the outer end of the box.

T designates a circular groove in the flange Q at the inner end of the box; U U, a series of passages made through the inner shell or wall of the box; V, a ring, in this instance flanged, located at the outer end of the box and internally threaded to engage the threaded end of the outer shell or wall; W, a removable cap having a flange externally threaded, adapted to engage the threads on the inside of the projecting edge of the ring V and when seated to frictionally engage the external surface and side of the ring L, which forms part of the ball-bearing cage; X, a washer, located as shown; Y, an internally-threaded flanged ring secured to the inner threaded end of the exterior shell or wall O of the box and projecting as far as the flange B of the axle; Z, a flange integral with the ring Y and cut away or beveled on one side adjacent the circular groove T of the inner shell or wall; Z', a collar frictionally engaging the flange B on the axle; $Z^2$, a circular recess between the flange Z and the collar; $Z^3$, a groove cut in the upper surface of the shoulder C and the axle adjacent thereto, and $Z^4$ is an open space between the box and shoulder C of the axle.

The functions of the important elements are as follows: The threaded part G of the cage being adjustable in the end of the axle can advance the axle within the box such a distance that the flange B and collar Z' will be in line and frictionally engage each the other, effectively excluding all dust and dirt, and at the same time a space $Z^4$ will be left between the shoulder C of the axle and the flange Z of the box, thus entirely eliminating friction between the axle and box at the inner ends. The circular groove in the ring L and the beveled edges of the flange H and washer I constitute bearing-surfaces for the balls N, which latter can move freely in a circular path and at the same time prevent any endwise movement of the part G of the cage relative to the ring L. Should the beveled edges of the washer I and flange H become worn, the removal of a washer K will afford ample compensation therefor. The cap W serves to close the end of the box and also to firmly press the ring L of the cage against the box, so that all these elements—box, ring, and cap—will revolve together. The recess E in the end of the axle receives the jam-nut J.

The method of assembling the several parts and of removing and replacing the wheel, as well as the way of effecting the adjustment of the parts of the cage and of the cage itself relative to the axle and box, are all quite obvious and need not be specifically described. From the foregoing it will be apparent that we have produced an axle and box which secure all the ends set forth as the object of our improvements and also possess many other characteristic and desirable features. It will be noticed particularly that in our construction and arrangement a single series of balls takes the end thrusts between the box and axle in both directions and that the axle itself supports the load.

While we have illustrated and described but one example of the physical embodiment of our invention, we do not thereby intend to exclude other examples made by other modes of the application of the principle. Modifications and changes and the substitution of equivalents may also be introduced in practice without constituting a substantial departure. Some of the possible variations in construction are as follows: The flange H may be separable from and not integral with the part G. Washer I may be integral with the part G and the flange H in the form of a washer secured in position by a nut. The element G may be omitted, the axle reduced in diameter at the end and beveled, and a removable beveled washer and nut in combination with the ring L and the balls constitute the thrust-bearing. The flanges V and Y may be integral with the outer shell or wall O and adapted to support any type of spokes. The axle may be solid or tubular. The flanges Q Q' $Q^2$ $Q^3$ may be integral with the outer shell or be made separate and adjusted between the two shells or walls of the box. These and many other embodiments we intend to embrace within the scope of our claims.

What we claim as new, and desire to secure by Letters Patent, is—

1. The combination with an axle and a box which is in direct frictional contact with the axle, of a ball thrust-bearing located at the end of the axle, and taking the thrusts in both directions; in substance as set forth.

2. The combination with an axle and a box which is in direct frictional contact with the axle, of a ball thrust-bearing located at the end of the axle, and taking the thrusts in both directions, said axle being adjustable longitudinally relative to the thrust-bearing; in substance as set forth.

3. The combination with a fixed axle which does not revolve, of a box in direct frictional contact with the axle and which revolves; and a single adjustable ball thrust-bearing which holds the box against endwise movement in both directions.

4. The combination with an axle and box which is in direct frictional contact with the axle, of a ball thrust-bearing located on the end of the axle, said axle being so disposed relative to the ball thrust-bearing and the box that the inner end of the box and the enlarged portion of the axle, as shoulder C, are not in frictional contact; in substance as set forth.

5. The combination with an axle and box, of a threaded ball thrust-bearing located at the end of the axle and taking the end thrusts in both directions; said axle being in frictional contact with the inner surface of the box and taking the weight of the load; in substance as set forth.

6. The combination with an axle and a box, of a ball-thrust-bearing cage adjustable in an opening made in the end of the said axle; in substance as set forth.

7. The combination with an axle and box, of the detachable ball-thrust-bearing cage F which takes the thrusts in both directions; in substance as set forth.

8. The combination with an axle and a box, of a ball thrust-bearing; an adjustable washer I; and a washer K; in substance as and for the purpose set forth.

9. The combination with an axle and box, of a ball-thrust-bearing cage composed of a threaded bolt G, beveled flange H, washer I, ring L, and balls N; in substance as set forth.

10. A ball-thrust-bearing cage comprising the headed and threaded bolt G, flange H, washer I, jam-nut J, balls N, and ring L; in substance as set forth.

11. A ball-thrust-bearing cage comprising the threaded bolt G, flange H, washer I, jam-nut J, washer K, balls N, and ring L; in substance as set forth.

12. A ball-bearing cage comprising a grooved ring L, a bolt, as G, having at one end a circular groove, and balls N located within the groove of ring L and the circular groove; in substance as set forth.

13. The combination with an axle-box, of an axle having a threaded opening in the end, and a threaded ball-thrust-bearing cage which takes the thrusts in both directions and is adjustable in the said opening; in substance as set forth.

14. The combination with an axle-box, of an axle, a single-ball thrust-bearing located at the end of the axle, and a cap, as W, secured to the box and entirely inclosing the ball thrust-bearing; in substance as set forth.

15. The combination with an axle-box, of an axle, a ball thrust-bearing having a ring L, and a cap for forcing and holding the said ring against the end of the box, said box being in direct frictional contact with the axle; in substance as set forth.

16. The combination with an axle-box, of an axle; a ball thrust-bearing located at the end of the axle and having a ring L; and a cap W engaging the ring, said box and axle being in frictional contact and the axle taking the weight of the load; in substance as set forth.

17. An axle-box made up of the inner and outer shells separated by flanges or partitions; and the flanges V, Y, at the ends of the outer shell; in substance as set forth.

18. The combination with the axle and axle-box, of a ball thrust-bearing located at the end of the axle and taking the thrusts in both directions; and a threaded cap independent of the balls of the bearing, and completely closing the end of the box to which it is secured; in substance as set forth.

19. The combination of the axle, the adjustable ball thrust-bearing, and the threaded cap engaging the axle-box; in substance as set forth.

In testimony whereof we affix our signatures in presence of two witnesses.

HARLAN P. WELLS.
OSGOOD MORRILL.

Witnesses:
GEORGE N. BRIGGS,
DELL W. DOLBIER.